(12) United States Patent
McNeilan

(10) Patent No.: US 6,182,454 B1
(45) Date of Patent: Feb. 6, 2001

(54) ENVIRONMENTAL CONTROL SYSTEM

(75) Inventor: Michael McNeilan, Goshen, OH (US)

(73) Assignee: James L. Deckebach, Cincinnati, OH (US)

(*) Notice: Under 35 U.S.C. 154(b), the term of this patent shall be extended for 0 days.

(21) Appl. No.: 09/334,507

(22) Filed: Jun. 21, 1999

(51) Int. Cl.[7] .............................. F25B 49/00; F25D 17/04
(52) U.S. Cl. .......................... 62/176.4; 62/176.6; 62/180; 62/185; 62/310; 165/225; 236/446
(58) Field of Search ................................ 62/176.4, 176.6, 62/179, 180, 310, 185; 236/44 B, 44 C; 165/222, 223, 225, 229

(56) References Cited

U.S. PATENT DOCUMENTS

| 5,400,608 | * | 3/1995 | Steed et al. | 62/91 |
| 5,400,612 | * | 3/1995 | Hedges | 62/171 |
| 5,469,707 | * | 11/1995 | Dadachanji | 62/3.3 |

* cited by examiner

Primary Examiner—William Doerrler
Assistant Examiner—Marc Norman

(74) Attorney, Agent, or Firm—Wood, Herron & Evans L.L.P.

(57) ABSTRACT

An environmental control system for maintaining a predetermined air temperature and relative humidity level of the interior of an enclosure, such as a wine cellar. A liquid chiller is provided which is adapted to cool liquid being circulated therethrough. An air handler has a cabinet with a heat exchanging unit and a blower disposed therein. The heat exchanging unit is operatively connected to the liquid chiller to receive cooled liquid being discharged therefrom. The blower is adapted to direct air from the enclosure over the heat exchanging unit such that the enclosure air is cooled. A liquid cascade unit has at least one surface with an upper and lower portion and a liquid collection pan attached to that lower portion. The upper portion is operatively connected to the heat exchanging unit such that liquid flows down from the upper portion toward the lower portion and into the liquid collection pan. The liquid collection pan is connected to the liquid chiller to return the collected liquid back to the liquid chiller. As such, the air handler is operative to cool the air inside the enclosure to a predetermined temperature in a closed loop fashion. The liquid cascade unit is also operative to cool the air inside the enclosure and further operative to regulate the relative humidity within the enclosure in an open-loop fashion.

33 Claims, 3 Drawing Sheets

ENVIRONMENTAL CONTROL SYSTEM

FIELD OF THE INVENTION

The present invention generally relates to environmental control systems, and, more particularly, to environmental control systems for use in wine storage facilities.

BACKGROUND OF THE INVENTION

The conditions under which a bottle of wine is stored are critical to the wine aging properly. If the wine is not stored properly, it may age too rapidly or develop undesirable bacteria within the wine, spoiling the wine even though the wine bottle is sealed. A typical method to seal the bottle is using a cork. A cork acts as semi-permeable membranes to permit vapor, and in some instances liquid, to pass through the cork. As such, if the vapor pressure is greater inside the wine bottle than outside, the vapor inside the wine bottle will escape through the cork until the pressure is equalized. Conversely, if the vapor pressure is greater outside the bottle, vapor will tend to enter the bottle through the cork until the pressure is equalized. Ideally, the wine should be stored so that vapor escapes from the wine bottle through the cork in a controlled manner. Storing wine bottles in an environmentally controlled wine cellar is considered an optimal technique to age the wine, where environmentally controlled means maintain the air temperature and relative humidity within the wine cellar at desired values.

Wine cellars are used in a wide variety of situations, such as wine retailers, and restaurants. In addition, many individuals collect and store wines within their homes, requiring custom-built wine cellars. Although these custom-built wine cellars vary in their features, they commonly have a single entrance door, which when closed substantially seals the wine cellar from its surrounding environment. They also typically include interior lighting, storage bins, and possibly a table and chairs. Depending on the size of the individual's wine collection, these wine cellars may hold from several hundred bottles of wine to tens of thousands of bottles of wine. This large number of bottles represents a sizable investment by the individual, so proper aging of the wine is critical to achieving a satisfying return on that investment.

Wines produced in Burgundy and Bordeaux, France are stored in caves which have a year-round temperature of about 55° F. This temperature appears to be an ideal temperature to produce and store wines in general. Therefore, to match the conditions under which wines have historically been stored in caves, most wine cellars are maintained between 50–60° F. It has also been found that maintaining the relative humidity within the wine cellar in the range of about 65–80% is desirable so that vapor within the wine bottle will not escape at an accelerated rate. For instance, if the relative humidity in the wine cellar is maintained at a relatively low relative humidity, such as 25%, the vapor generated inside the wine bottle will permeate through the cork and into the wine cellar. This undesirable process will upset the critical chemical balance of the wine, resulting in an ill-tasting wine. In contrast, a relative humidity of about 100% should not be maintained because it will ultimately lead to mold growing on the labels of the individual wine bottles disfiguring their appearance. Although this high humidity does not harm the wine, the moldy labels will certainly lessen the wine bottle's visual appeal.

It is also essential in storing wine that the temperature not only be at a desired value but also that the temperature be maintained relatively constant. If the temperature is allowed to fluctuate widely, the wine will age too rapidly, significantly influencing the taste of the wine, usually for the worse. It is critical, therefore, that the temperature and relative humidity be maintained as constant as possible and allowed to fluctuate only within fairly tight ranges.

To maintain the proper air temperature and relative humidity within a wine cellar, a system is required to cool the air within the wine cellar as well as humidify and, if necessary, dehumidify the air to maintain the proper relative humidity. Conventional environmental control systems are not ideally suited to achieve and maintain the desired air temperature and relative humidity simultaneously. For instance, a standard air conditioning unit can provide air temperatures in the range of 65–78° F., with a resulting relative humidity of about 20–30%. A standard air conditioning unit is not capable of humidifying the air to raise the relative humidity while it operates to cool the air. A refrigeration system can generate temperatures between 33–50° F., with a resulting relative humidity of about 10–15%. A standard humidification unit which uses a humidistat to measure the relative humidity in an enclosure, adds moisture within the enclosure when required. The humidification unit, however, cannot dehumidify or reduce the relative humidity in the enclosure. Typically, dehumidification must be provided by a separate system. Consequently, an environmental control system for maintaining the ideal air temperature and relative humidity in a wine cellar would require the installation of three separate known systems, yielding a complicated and expensive system.

What is needed, therefore, is a single environmental system which is able to control the air temperature within the wine cellar in a relatively tight range, preferably between 54–57° F. as well as a relative humidity range preferably between 70–80%. Such a system would be required to operate continuously and economically to maintain the temperature and relative humidity within these narrow ranges.

SUMMARY OF INVENTION

The present invention is directed to an environmental control system for maintaining a predetermined air temperature and relative humidity level of the interior of an enclosure, such as a wine cellar. To that end and in accordance with the principles of the invention, a liquid chiller is provided which is adapted to cool liquid being circulated therethrough. An air handler has a cabinet with a heat exchanging unit and a blower disposed therein. The heat exchanging unit is operatively connected to the liquid chiller to receive cooled liquid being discharged therefrom. The blower is adapted to direct air from the enclosure over the heat exchanging unit such that the enclosure air is cooled. A liquid cascade unit has at least one surface with an upper and lower portion and a liquid collection pan attached to that lower portion. The upper portion is operatively connected to the heat exchanging unit such that liquid flows down from the upper portion toward the lower portion and into the liquid collection pan. The liquid collection pan is connected to the liquid chiller to return the collected liquid back to the liquid chiller. As such, the air handier is operative to cool the air inside the enclosure to a predetermined temperature in a closed loop fashion. The liquid cascade unit is also operative to cool the air inside the enclosure and further operative to regulate the relative humidity within the enclosure in an open-loop fashion.

DETAILED DESCRIPTION OF DRAWINGS

DETAILED DESCRIPTION OF PREFERRED EMBODIMENTS

Figure 1:
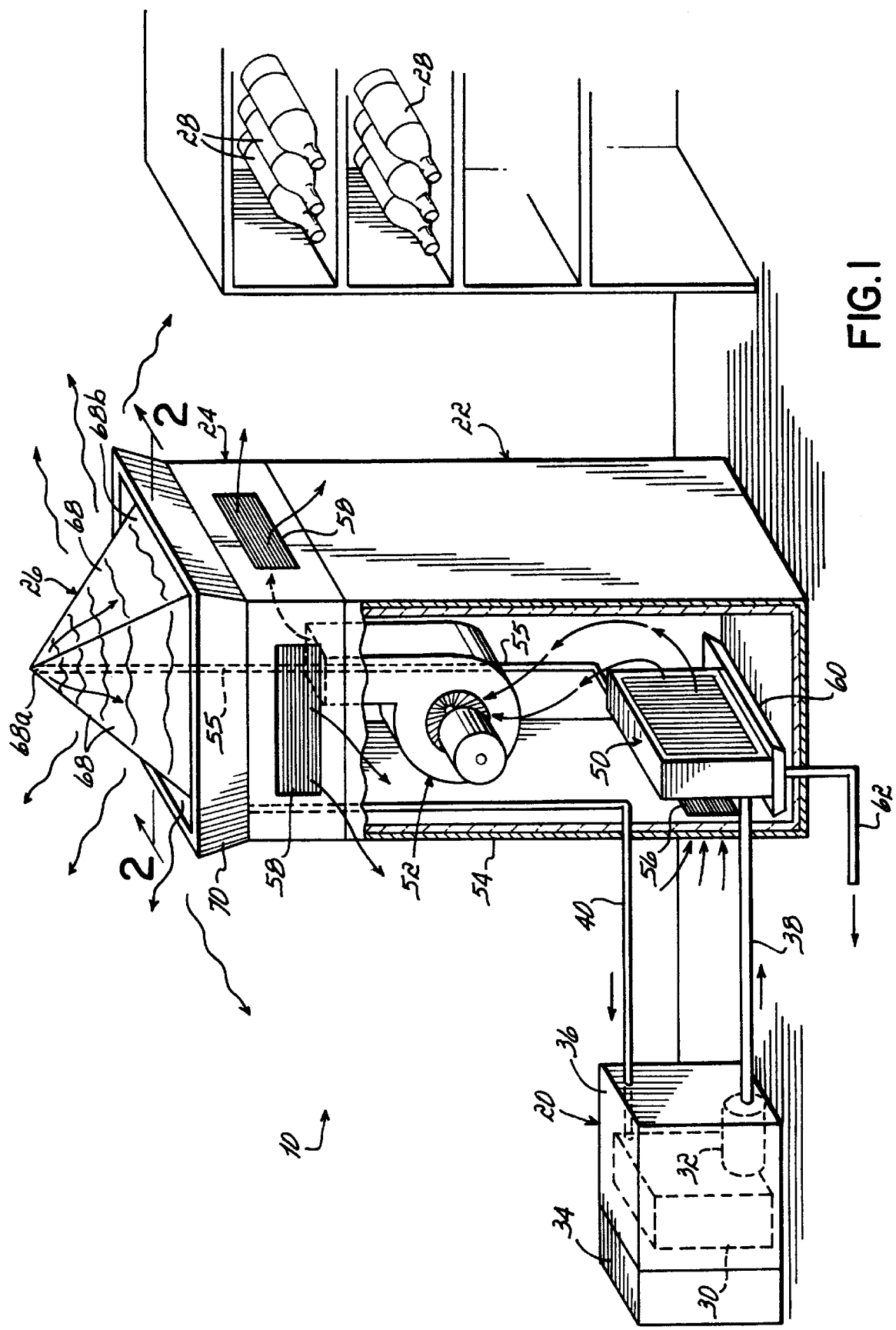
FIG. 1 is a perspective view of the environmental control system constructed according to a preferred embodiment.

Referring first to FIG. 1, an environmental control system 10 is shown constructed in accordance with the principles of the present invention. The environmental control system 10 incorporates a liquid chiller 20, an air handler 22, an air diffuser 24, and a liquid cascade unit 26 interconnected together to provide a system capable of cooling the air interior to an enclosure as well as maintaining the relative humidity therein. Although the environmental control system 10 of the present invention is capable of maintaining the temperature and relative humidity at desired values of any substantially sealed enclosure, the environmental control system is particularly suited for operation within a wine cellar in which individual bottles of wine 28 are stored. Furthermore, the environmental control system 10 is designed for wine cellars in which the cooling and humidification loading is relatively constant. In other words, the environmental control system 10 is not exposed to large fluctuations in temperature and/or relative humidity during its operation.

The liquid chiller 20 includes a chilling unit 30, a liquid pump 32, and a liquid reservoir 34 contained within a housing 36. While the liquid could be any suitable liquid, the liquid used in the environmental control system 10 is preferably water. Depending on the cooling load of the wine cellar, the liquid chiller 20 should have a cooling capacity of between 1000 and 20,000 BTU/hr for producing a water temperature of at least 45° F. and preferably at least 38° F. In addition, the liquid chiller 20 should be capable of chilling the output water to a temperature which is directly related to the water's input temperature. For example, the liquid chiller 20 could be capable of reducing the input water temperature by at least 10° F. While the pumping capacity of the liquid pump 32 will vary with the requirements of a particular wine cellar, it is contemplated that for most applications the liquid pump 32 should be controllable to produce a regulated flow rate in the range between about 0 and 10 gallons of water per minute (gpm), and preferably in the range between about 0 and 6 gpm, and most preferably about 3 gpm. One such chiller unit suitable for use in the environmental control system 10 is chiller Model CFT-75 manufactured by Neslab Instruments, Inc., Portsmouth, N.H. 03802-1178. The liquid reservoir 34 is filled with water to feed the chilling unit 30 upon start up and in the event the overall water level in the environmental control system 10 drops below a certain level. The liquid chiller 20 has supply line 38 and return line 40 shown with associate arrows indicating the direction of the flow of water.

The air handler 22 includes a heat exchanging unit 50 and a blower 52 contained within an insulated housing 54. The supply line 38 is connected to the heat exchanging unit 50 to supply it with chilled water. The heat exchanging unit 50 includes a discharge conduit 55 for delivering the chilled water exiting the heat exchanging unit 50 onto the liquid cascade unit 26. The insulated housing 54 includes a louvered opening 56 which permits air to be drawn into the insulated housing 54 by the blower 52. The air diffuser 24 is positioned directly on top of and in fluid communication with the air handler 22 so that the blower 52 may direct air out of the vents 58 and into the interior of the wine cellar. The heat exchanging unit 50 sits in a liquid collection pan 60 for collecting moisture condensed from the air flowing through the heat exchanging unit 50. A drain conduit 62 is connected to the liquid collection pan 60 to drain any accumulated water out of the liquid collection pan 60. The drain conduit 62 is preferably connected to a drain (not shown) to provide a convenient method for disposing of the accumulated water. The air handler 22 can be any suitable standard air handler such as Model DVX-600 manufactured by the MagicAire Division of the United Electric Company, Wichita Falls, Tex. 76301. Working in cooperation with each other, the liquid chiller 20 and the air handler 22 should be sized so that the air temperature can be cooled to at least about 57° F.

The liquid cascade unit 26 sits atop the air diffuser 24 with the discharge conduit 55 running up the center of the liquid cascade unit 26 to discharge the water at its upper most point. As shown, the pyramidal-shaped liquid cascade unit 26 has four, inclined surfaces 68 with an upper portion 68a and a lower portion 68b. The liquid cascade unit 26 includes a liquid collection pan 70 located along the lower portion 68b for collecting the water cascading down the inclined surfaces 68.

Figure 2:
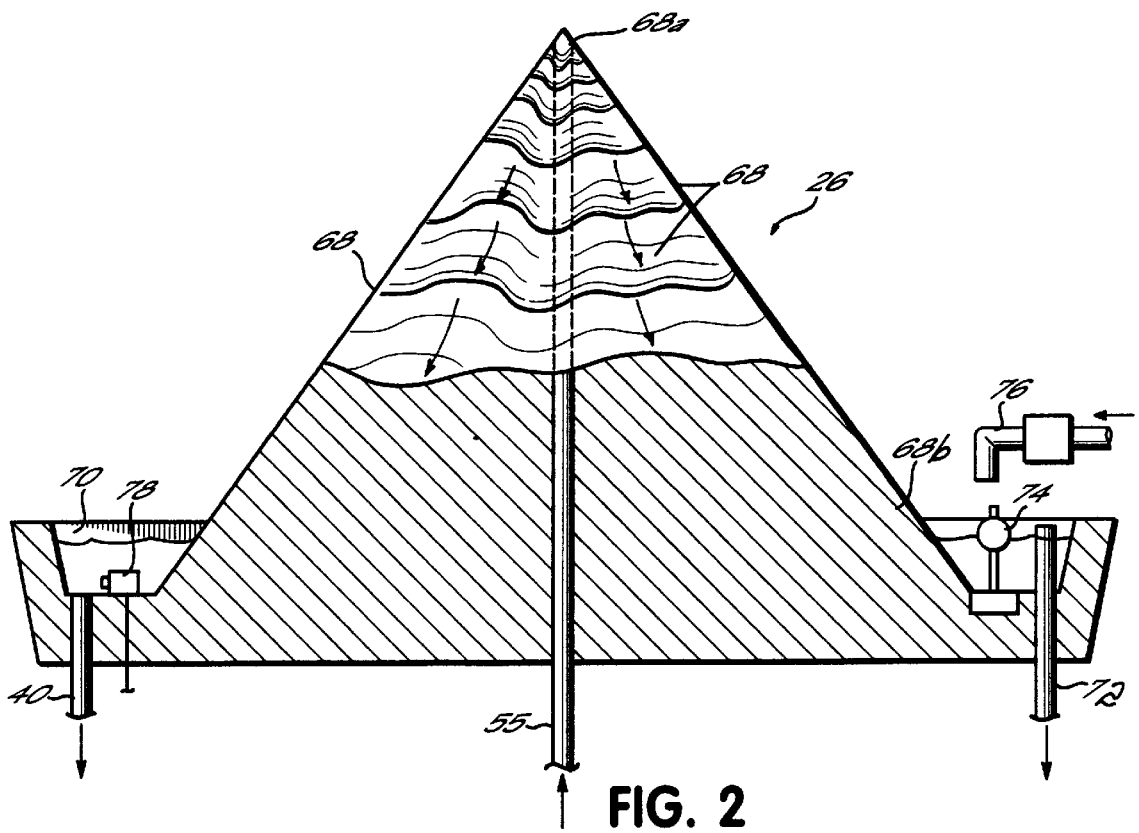
FIG. 2 is a schematic enlarged cross-sectional view of the liquid cascade unit taken along line 2—2 in FIG. 1.

With reference now to FIG. 2, the liquid collection pan 70 includes an overflow conduit 72 which is positioned so that the water in the liquid collection pan 72 will exit through the overflow conduit 72 before it has a chance to overflow the sides of the liquid collection pan 70. The overflow conduit 72 is preferably connected to the same drain (not shown) to which drain conduit 62 is connected. The liquid collection pan 70 further includes a control valve 74 for monitoring the level of the water in the liquid collection pan 70. The control valve 74, which is preferably a float valve, is particularly configured to release more water via an input line 76 into the liquid collection pan 70 when the water level reaches a predetermined low level. Water reaching this predetermined low level still sufficiently covers the return line 40 to allow continued operation of the environmental control system 10 without damage it even if no additional water is added. The control valve 74 is operatively connected to a water supply (not shown) which is connected to the input line 76. The water supply could be a household water supply line or a self-contained, refillable container. It is contemplated that once the environmental control system 10 is operational in a steady-state condition, only a relatively small amount of water will need to be added back into the liquid collection pan 70. Finally, the liquid collection pan 70 includes a low water level detector 78 which is operatively connected to the liquid chiller 20 and the air handler 22. As such, when the water level drops reaches a critically low level, the entire environmental control system 10 shuts down, i.e., becomes nonoperative. The low water level detector 78 is positioned so that the environmental control system 10 and more particularly liquid pump 32 will shut down before the liquid collection pan 70 becomes dry and return line 40 begins drawing air into liquid pump 32. Although the control valve 74 is designed to supply additional water to the liquid collection pan 70 if the water level gets too low, the low water level detector 78 is a fail safe backup for the entire environmental control system 10. As an alternative to having the separate low water level detector 78, the control valve 74 may be configured with a two-stage sensor. That is, when the water level reaches the predetermined low level as described above, more water is called for from the water supply via input line 76. If, however, the water supply fails to deliver enough water and the water level reaches the critically low level, the control valve 74 would shut down the entire environmental control system 10 to protect it from the harmful effects of operating with insufficient water.

The liquid cascade unit 26 is preferably constructed from a material with good thermal conductivity and high resistance to corrosion.

For example, the liquid cascade unit 26 could be made from natural materials such as marble or granite. Additionally, the liquid cascade unit 26 could take on a wide variety of shapes, such as a statue or other work of art.

In operation, the environmental control system 10, as just described above, provides closed-loop control over the air temperature within the wine cellar and provides open-loop control over the relative humidity of the wine cellar air. To that end and in accordance with the principles of the present invention, liquid chiller 20 delivers chilled water via supply line 38 to heat exchanging unit 50. When operative, the liquid chiller 20 generates chilled water at a temperature of preferably about 38° F. The chilled water circulates through and cools the external surfaces of the heat exchanging unit 50. While operative, the blower 52 draws in air through the louvered opening 56 and across the exterior surfaces of the heat exchanging unit 50 as indicated by the arrows in of FIG. 1. The air passing over the cooled exterior surfaces of the heat exchanging unit 50 is cooled and then blown out of the air handler 22 through the vents 58 in air diffuser 24. The air temperature interior to the wine cellar is primarily controlled by the cooled air provided by the air handler 22. This aspect of the invention is closed loop because a thermostat (not shown) is operatively connected to the blower 52 such that when the air temperature in the wine cellar reaches a predetermined value, the blower shuts off and the water simply passes through the heat exchanging unit 50 and onto the liquid cascade unit without further cooling the air. The blower 52 shuts down when the thermostat detects an air temperature in the wine cellar of about 57° F. The blower 52 will become operative, i.e., turn back on, when the thermostat detects an air temperature in the wine cellar of about 59° F. In the process of drawing air over the heat exchanging unit 50, some dehumidification of the air occurs as the relatively warm air contacts the cooled exterior surfaces of the heat exchanging unit 50. This moisture collects in the liquid collection pan 60 and exits through drain conduit 62. The dehumidification process, however, will cease once the air temperature reaches about 57° F. and the blower shuts down and no more air is actively drawn across the cooled surfaces of the heat exchanging unit 50.

The operation of the environmental control system 10 continues with the chilled water exiting the heat exchanging unit 50 through discharge conduit 55 and cascading down the inclined surfaces 68 of the liquid cascade unit 26. When the blower 52 is operative, the temperature of the chilled water exiting the heat exchanging unit 50 rises to about 44° F. as the air drawn over the heat exchanging unit 50 heats the chilled water circulating therethrough. As the 44° F. chilled water flows down the inclined surfaces 68, the liquid cascade unit 26 is cooled to a temperature substantially equal to that of the cascading water. As the air in the wine cellar contacts the chilled cascading water, the air is further cooled beyond the cooling provided by the air handler 22. Preferably, the temperature in the wine cellar is maintained at a range of about 50–60° F., and most preferably at a temperature of about 55° F. To that end, the chilling unit 30, which is operatively connected to the same thermostat as the air handler, will shut down when the air temperature drops to about 55° F. Although the chilling unit 30 shuts down at an air temperature of about 55° F., the liquid pump 32 remains operative to continually cycle water throughout the environmental control system 10. When the air temperature thereafter rises to about 56° F., the chilling unit will become operative to provided chilled water to the liquid cascade unit 26 so that the air temperature can be lowered again to about 55° F. If the air temperature rises to about 59° F. the air handler will also become operative to add the needed cooling capacity so that the air temperature in the wine cellar does not go above the desired range.

In addition to the cooling effect provided by the liquid cascade unit 26, the operation of the liquid cascade unit 26 provides control over the wine cellar's relative humidity. With the blower 52 operative, 44° F. chilled water flows down the liquid cascade unit 26 and releases moisture into the air to increase the relative humidity within the wine cellar. When air temperature drops to about 57° F. and the blower 52 shuts down, the temperature of the chilled water flowing down the liquid cascade unit 26 drops to about 38° F. As such, the liquid cascade unit 26 cools down and draws moisture out of the air to decrease the relative humidity within the wine cellar. When the air temperature begins to rise, the blower 52 becomes operative again and the chilled water flowing over the liquid cascade unit will rise to about 44° F. and begin humidifying the wine cellar air. Throughout this process neither the relative humidity nor the air temperature within the wine cellar remain constant, but instead continue fluctuating within relatively narrow ranges. The relative humidity of the wine cellar air is maintained preferably within the range of about 65–80%, and most preferably within the range of about 72–78% based on a nominal temperature preferably in the range of about 55–57° F.

In the humidification process, a small portion of the chilled water cascading down the inclined surfaces 68 evaporates and thereby increases the relative humidity of the wine cellar air. In the dehumidification process, the wine cellar air contacts the chilled water cascading down the inclined surfaces 68 and some fraction of the moisture in the air condenses into the cascading chilled water. Because there is no active control over this process, the liquid cascade unit 26 acts as an open-loop humidifier/dehumidifier depending on the condition of the wine cellar air. That is, the humidification/dehumidification process is not actively controlled by a humidistat. Instead the liquid cascade unit 26 is sized to maintain the proper relative humidity in the wine cellar by the mere process of cascading the chilled water over the inclined surfaces without being monitored or controlled by a humidistat.

The proper sizing of the components of the environmental control system 10 is essential to its proper operation, especially because the humidification/dehumidification process is an open-loop process. Factors to be considered in sizing the individual components of the environmental control system 10 include the size and thermal insulative value of any door or window in the wine cellar, the frequency of which the door is opened, the temperature and relative humidity of the environment surrounding the wine cellar, the number of operative lights within the wine cellar, and the overall dimensions of the wine cellar. As the cooling and humidification loading increases, the capacity of the individual components of the environmental control system 10 must be increased in order to maintain the desired air temperature and relative humidity. One possible way to increase the humidification capacity of the environmental control system 10 is to add additional liquid cascade units 26 throughout the wine cellar without replicating the entire environmental control system 10. These additional liquid cascade units 26 would be supplied with chilled water from additional supply lines branching off of the discharge conduit 55. Each additional liquid cascade unit 26 would require a return line 40 which leads back to the liquid chiller 20.

A humidistat can be operatively connected to the liquid pump 32 of the liquid chiller 20 to provide additional control over the humidification/dehumidification process. In this embodiment the liquid pump 32 is a variable pump which can vary the water flow rate through the environmental control system 10. For most installations, the variable pump should be controllable to generate a regulated flow rate in the range between about 0 and 10 gallons of water per minute (gpm), and preferably in the range between about 0 and 6 gpm, and most preferably about 3 gpm. In a typical installation, the environmental control system 10 is sized so that the liquid pump 32 generates a nominal flow rate of about 3 gpm. However, when the relative humidity in the wine cellar decreases, the humidistatically controlled liquid pump 32 increases its water flow rate to between about 3–10 gpm until the relative humidity is restored to the accepted range. Conversely, when the relative humidity increases, the humidistatically controlled liquid pump 32 decreases its water flow rate to between about 0–3 gpm until the relative humidity is restored to the accepted range.

Figure 3:
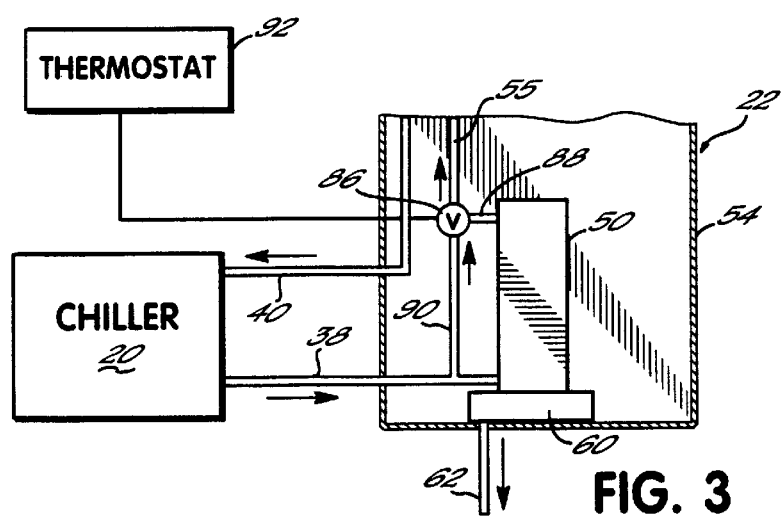
FIG. 3 is a schematic partial cross-sectional view illustrating a modified plumbing configuration in the air handler.

With reference now to FIG. 3, an alternate plumbing configuration is shown in conjunction with the operation of the heat exchanging unit 50. A control valve 86 is positioned near the beginning of discharge conduit 55 just as the chilled water exits the heat exchanging unit 50 through discharge stub 88. A bypass conduit 90 extends from supply line 38 just prior to the supply line 38 entering the heat exchanging unit 50. The bypass line 90 connects to the control valve 86. The control valve 86 is operatively connected to a thermostat 92 monitoring the wine cellar air temperature. When the wine cellar air temperature is greater than about 57° F. the control valve 86 is positioned so that the chilled water circulates through the heat exchanging unit 50 substantially as described above for the embodiment shown in FIG. 1, i.e., no water flows through bypass conduit 90. However, when the wine cellar air temperature drops below 57° F. the control valve 86 is positioned to permit chilled water to flow through bypass conduit 90 and not through discharge stub 88 or the heat exchanging unit 50. When the wine cellar air temperature rises above about 59° F., the thermostatically controlled control valve 86 shuts off bypass conduit 90 and permits water to flow through the heat exchanging unit 50. In this embodiment, the blower 52 remains operative regardless of the wine cellar air temperature. That is, the blower 52 draws in air over the heat exchanging unit 50 continuously, even though the heat exchanging unit 50 is not always operative to cool the incoming air.

Figure 4:
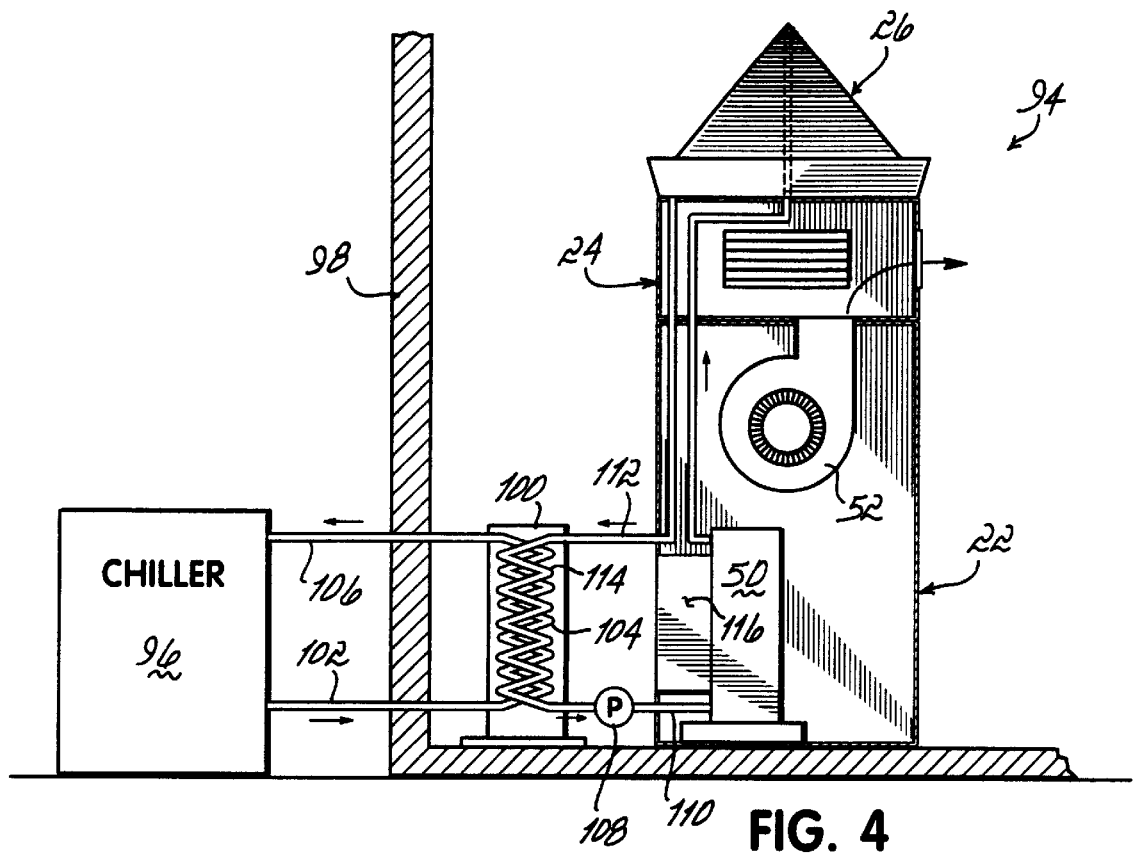
FIG. 4 is a schematic cross-sectional view of the environmental control system constructed according to another preferred embodiment.

Another embodiment of an environmental control system 94 constructed in accordance with the principles of the present invention is illustrated in FIG. 4. Some individuals may find the continuous operation of the liquid chiller 20 and its liquid pump 32 excessively noisy when located within the interior of the house. To alleviate this noise problem, a liquid chiller 96 is placed outside the house 98 with appropriate plumbing leading inside the house and to the environmental control system 94.

As shown in FIG. 4, an intermediate heat exchanging unit 100 is incorporated into the environmental control system 94 so that the chilled liquid circulated by the liquid chiller 96 can chill the water circulating throughout the environmental control system 94. More specifically, the liquid chiller 96 which is capable of operating outdoors circulates glycol or any other suitable chillable liquid with a low freezing point. The glycol exits the liquid chiller 96 through supply line 102 which enters the intermediate heat exchanging unit 100. The supply line 102 forms a first coiled section 104 within the intermediate heat exchanging unit 100. The glycol returns to the liquid chiller 96 through return line 106 where it can be chilled again before being sent out again via a supply line 102. The environmental control system 94 further includes a liquid pump 108 for circulating the water throughout the environmental control system 94. In one aspect of this embodiment, the liquid pump 108 may be operatively connected to a humidistat. As such, the flow rate of the liquid pump 108 could be varied as a function of the relative humidity within the wine cellar interior. The liquid pump 108 pumps chilled water from the intermediate heat exchanging unit 100 into a supply line 110 which leads to the heat exchanging unit 50. The water returns to the intermediate heat exchanging unit 100 via a return line 112. The intermediate heat exchanging unit 100 contains a second coiled section 114 which interacts with the first coiled section 104. As such, the chilled glycol circulating through first coiled section 104 chills the water circulating through second coiled section 114. The remaining portion of the environmental control system 94 operates substantially in the same manner as the environmental control system 10 described above. The air handler 22 shown in FIG. 4 further includes a short piece of duct work 116 connecting the louvered opening 56 to the heat exchanging unit 50. The duct work 116 ensures that the substantially all the air entering through the louvered opening 56 will flow directly over the heat exchanging unit 50.

Figure 5:
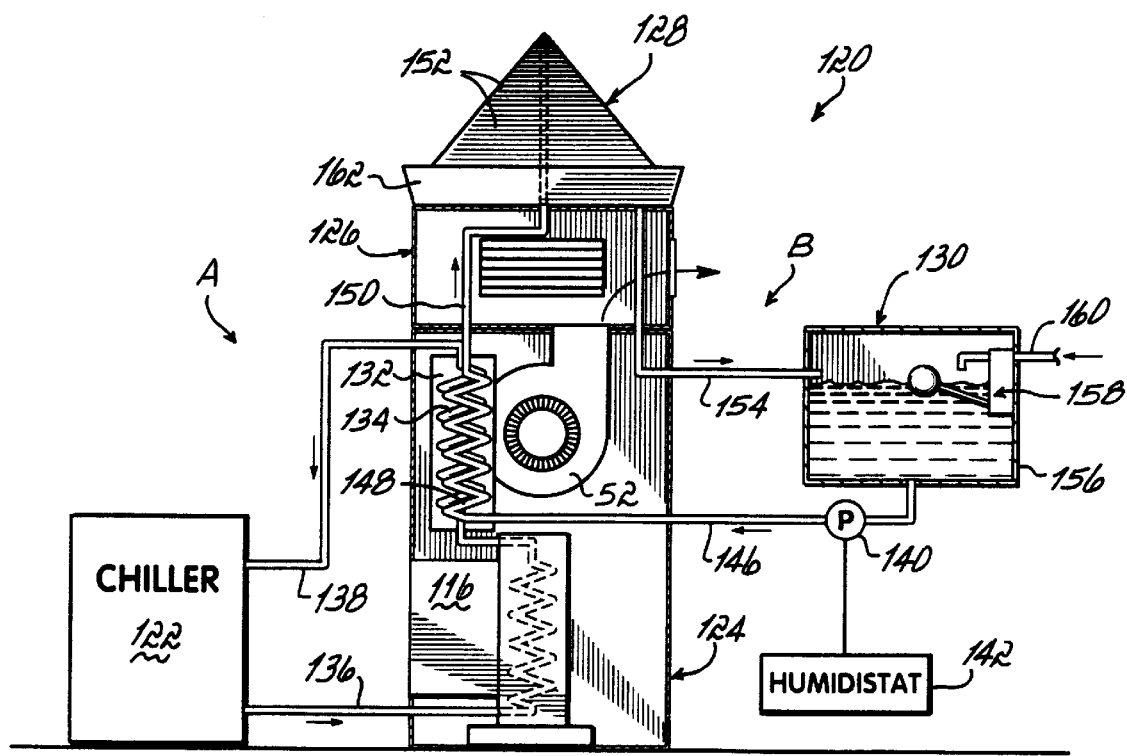
FIG. 5 is a schematic cross-sectional view of the environmental control system constructed according to another preferred embodiment.

With reference now to FIG. 5, another embodiment of an environmental control system 120 constructed in accordance with the principles of the present invention is illustrated. Unlike the previously described embodiments in which only one water circuit was employed to provide temperature and relative humidity control, the environmental control system 120 employs two separate water circuits. The first water circuit designated generally in FIG. 5 as A provides the majority of cooling of the wine cellar air. The second water circuit designated generally in FIG. 5 as B provides some cooling of the wine cellar air but primarily provides the humidification/dehumidification of the wine cellar air. The primary components of the environmental control system 120 include a liquid chiller 122, an air handler 124, and air diffuser 126, liquid cascade unit 128, and a relative humidity control unit 130. The operation, control, and construction of the liquid chiller 122 is substantially the same as that of liquid chiller 20, including the chilling unit 30 and the liquid pump 32. The construction of the air handler 124 is similar to that of air handler 22 with the inclusion of a second heat exchanging unit 132. The first water circuit A begins with chilled water entering the heat exchanging unit 50 via a supply line 136. After exiting the heat exchanging unit 50 the chilled water enters directly into a first coiled section 134 which comprises the first half of the second heat exchanging unit 132. After exiting the second heat exchanging unit 132, the water returns to the liquid chiller 122 via return line 138 to complete the first water circuit A.

The second water circuit B begins with supply line 146 supplying water to a second coiled section 148 which comprises the second half of the second heat exchanging unit 132. First and second coiled sections 134, 148 intertwine such that incoming water in the second coiled section 148 is chilled by the water flowing through the first coiled section 134. After being chilled, the water in the second coiled section 148 exits the second heat exchanging unit 132 via discharge conduit 150. The discharge conduit is connected to the liquid cascade unit 128 to cascade water down inclined surfaces 152 of the liquid cascade unit 128. In this respect, the construction and operation of the liquid cascade unit 128 is substantially similar to that of liquid cascade unit 26 as described above. The water is returned to the relative humidity control unit 130 via a return line 154 to complete the second water circuit B. The water is circulated through the second water circuit by a liquid pump 140 connected to the supply line 146. The relative humidity control unit 130 includes a holding tank or reservoir 156, a control valve 158 and a water input 160.

In operation, chilled water is circulated through the first water circuit A. Until the air temperature drops to about 57° F. the blower 52 is operative to draw air over the heat exchanging unit 50 and distribute it to the wine cellar via air diffuser 126. When air temperature reaches about 57° F., the thermostatically controlled blower 52 shuts off, but the chilled water continues to circulate through the first water circuit A. In addition, if the air temperature drops to about 55° F., the thermostatically controlled liquid chiller 122 and, more specifically, chilling unit 30 stops chilling water but liquid pump 32 continues to circulate water through the first water circuit A. If after reaching about 55° F., the air temperature rises to about 56° F., the chilling unit 30 becomes operative again to circulate chilled water through the first water circuit A. If the air temperature continues to rise and reaches about 59° F., the blower 52 will become operative to provide additional capacity to cool the wine cellar air back to its desired temperature of about 55° F.

The second water circuit B delivers chilled water from the second heat exchanging unit 132 to the liquid cascade unit 128. The chilled water cascades down the inclined surfaces 152 into a liquid collection pan 162 from where drain line 154 returns it to the holding tank 156. The cascading of chilled water over the inclined surfaces 152 provides some cooling effect to the wine cellar air temperature, but primarily provides a means for humidifying or dehumidifying the wine cellar air. More specifically, liquid pump 140 is preferably a variable pump capable of varying the water flow rate. The variable liquid pump 140 operatively connected to a humidistat 142 which monitors the relative humidity of the air within the wine cellar. For most installations, the variable pump should be controllable to generate a regulated flow rate in the range between about 0 and 10 gallons of water per minute (gpm), and preferably in the range between about 0 and 6 gpm, and most preferably about 3 gpm. In a typical installation, the environmental control system 120 is sized so that the liquid pump 32 generates a nominal flow rate of about 3 gpm. However, when the relative humidity in the wine cellar decreases, the humidistatically controlled liquid pump 140 increases its water flow rate to between about 3–10 gpm until the relative humidity is restored to a desired value, about 75%. Conversely, when the relative humidity increases, the humidistatically controlled liquid pump 140 decreases its water flow rate to between about 0–3 gpm until the relative humidity is restored to the desired value.

As the humidification process continues, the water level of holding tank 156 may decrease below a critical level. When this low water level is reached, the control valve 158, preferably a float valve, operates to permit water to enter the tank via water input 160. The water input 160 could be connected to a household pressurized water supply line or alternatively connected to a self-contained, refillable container.

While the present invention has been illustrated by a description of various preferred embodiments and while these embodiments have been described in considerable detail in order to describe the best mode of practicing the invention, it is not the intention of Applicant to restrict or in any way limit the scope of the appended claims to such detail. Additional advantages and modifications within the spirit and scope of the invention will readily appear to those skilled in the art.

The invention itself should only be defined by the appended claims, wherein I claim:

1. An environmental control system for maintaining a predetermined air temperature and relative humidity level of the interior of an enclosure, comprising:

a liquid chiller to cool liquid being pumped therethrough;

an air handler having a cabinet with a heat exchanging unit and a blower disposed therein, said heat exchanging unit being operatively connected to said liquid chiller to receive cooled liquid being discharged therefrom, said blower adapted to direct enclosure air over said heat exchanging unit such that the enclosure air is cooled; and a liquid cascade unit having at least one surface with an upper and lower portion and a liquid collection pan attached to said lower portion, said upper portion being operatively connected to said heat exchanging unit such that liquid flows down from said upper portion toward said lower portion and into said liquid collection pan, said liquid collection pan being connected to said liquid chiller to return the collected liquid back to said liquid chiller;

wherein said air handler is operative to cool the air inside the enclosure to a predetermined temperature and said liquid cascade unit is also operative to cool the air inside the enclosure and further operative to regulate the relative humidity within the enclosure.

2. The environmental control system of claim 1, further comprising an air diffuser attached to said air handler to distribute air from said air handler into the interior of the enclosure.

3. The environmental control system of claim 1, wherein said liquid chiller includes a liquid pump and a liquid temperature sensor for monitoring the liquid being returned from said liquid collection pan, said liquid chiller being nonoperative when the returned liquid drops below a predetermined temperature, said pump being operative at any liquid temperature to continually pump liquid throughout the environmental control system.

4. The environmental control system of claim 3, wherein said liquid pump is a variable pump to provide varying flow rates, said variable pump being operatively connected to a relative humidity sensor and adapted to change the liquid flow rate inversely proportional to a change in the relative humidity in the enclosure.

5. The environmental control system of claim 1, wherein said liquid collection pan includes an overflow conduit for draining off excess accumulated liquid in said liquid collection pan.

6. The environmental control system of claim 1, wherein said heat exchanging unit has a liquid collection pan for collecting moisture condensed from the air flowing over said heat exchanging unit.

7. The environmental control system of claim 1, wherein said air handler includes an air temperature sensor operatively connected to said blower, said blower adapted to shut off when the enclosure air temperature drops below a predetermined temperature.

8. The environmental control system of claim 1, wherein said liquid collection pan includes a control valve operatively connected to a source of liquid, said control valve being adapted to direct additional liquid into said liquid collection pan when the liquid level goes below a predetermined level.

9. The environmental control system of claim 8, wherein said control valve is a float valve and the source of liquid is a reservoir.

10. The environmental control system of claim 1, wherein said liquid collection pan includes a liquid level sensor operative to shut down the environmental control system when the liquid goes below a predetermined level.

11. The environmental control system of claim 1, wherein said air handler further includes a valve operatively connected to an air temperature sensor, said valve becoming operative below a predetermined air temperature to divert the liquid coming from said liquid chiller directly to said liquid cascade unit thereby bypassing said heat exchanging unit.

12. The environmental control system of claim 11, wherein said blower remains operative even after said valve diverts liquid directly to said liquid cascade unit.

13. An environmental control system for maintaining a predetermined air temperature and relative humidity level of the interior of an enclosure, comprising:
- a liquid chiller to cool a first liquid being pumped therethrough, said liquid chiller located exterior to the enclosure, said liquid chiller having first supply and return lines entering the enclosure;
- a first heat exchanging unit located interior to the enclosure and connected to said liquid chiller via said first supply and return lines to define a first liquid circuit, said first heat exchanging unit having second supply and return lines through which a second liquid flows in a second liquid circuit;
- an air handler having a cabinet with a second heat exchanging unit and a blower disposed therein, said second heat exchanging unit being connected to said second supply line to receive the cooled second liquid, said blower adapted to direct enclosure air over said second heat exchanging unit to cool the enclosure air; and
- a liquid cascade unit having at least one surface with an upper and lower portion and a liquid collection pan attached to said lower portion, said upper portion being operatively connected to said second heat exchanging unit such that the second liquid flows down from said upper portion toward said lower portion and into said liquid collection pan, said liquid collection pan connected to said first heat exchanging via second return line to complete said second liquid circuit;
- wherein said air handler is operative to cool the air inside the enclosure to a predetermined temperature and said liquid cascade unit is also operative to cool the air inside the enclosure and further operative to regulate the relative humidity within the enclosure.

14. The environmental control system of claim 13, wherein said first liquid is glycol and said second liquid is water.

15. The environmental control system of claim 13, further comprising an air diffuser attached to said air handler to distribute air from said air handler into the interior of the enclosure.

16. The environmental control system of claim 13, wherein said second heat exchanging unit includes a liquid pump and said liquid chiller includes a liquid temperature sensor for monitoring the temperature of the second liquid in the second return line, said liquid chiller being nonoperative when the temperature of the second liquid drops below a predetermined temperature, said liquid pump being operative at any second liquid temperature to continually pump liquid throughout second liquid circuit.

17. The environmental control system of claim 16, wherein said liquid pump is a variable pump to provide varying flow rates throughout said second liquid circuit, said variable pump being operatively connected to a relative humidity sensor and adapted to change the liquid flow rate inversely proportional to a change in the relative humidity in the enclosure.

18. The environmental control system of claim 13, wherein said liquid collection pan includes an overflow outlet for draining off excess accumulated liquid in said liquid collection pan.

19. The environmental control system of claim 13, wherein said second heat exchanging unit has a liquid collection pan for collecting moisture condensed from the air flowing over said second heat exchanging unit.

20. The environmental control system of claim 13, wherein said air handler includes an air temperature sensor operatively connected to said blower, said blower adapted to shut off when the enclosure air temperature drops below a predetermined temperature.

21. The environmental control system of claim 13, wherein said liquid collection pan includes a control valve operatively connected to a source of the second liquid, said control valve being adapted to direct the additional second liquid into said liquid collection pan when the second liquid level goes below a predetermined level.

22. An environmental control system for maintaining a predetermined air temperature and relative humidity level of the interior of an enclosure, comprising:
- a first control loop operative to cool the air interior to the enclosure comprising
- a liquid chiller to cool a first liquid being pumped therethrough;
- an air handler having a cabinet with a first heat exchanging unit and a blower disposed therein, said first heat exchanging unit being operatively connected to said liquid chiller to receive the cooled first liquid being discharged therefrom, said blower adapted to direct enclosure air over said heat exchanging unit such that the enclosure air is cooled; and
- a second heat exchanging unit connected to said first heat exchanger to receive the cooled first liquid and further connected to said chiller to return the first liquid thereto; and
- a second control loop operative to cool the air interior to the enclosure and maintain the relative humidity within the enclosure comprising
- a reservoir for holding a second liquid;
- a liquid pump associated with said reservoir, said liquid pump being operatively connected to a relative humidity sensor, said liquid pump being nonoperative when the relative humidity within the enclosure goes above a predetermined value;
- said liquid pump connected to said second heat exchanging unit such that the cooled first liquid cools the second liquid passing through said second heat exchanging unit; and
- a liquid cascade unit having at least one surface with an upper and lower portion and a liquid collection pan attached to said lower portion, said upper portion being operatively connected to said second heat exchanging unit such that the cooled second liquid flows down from said upper portion toward said lower portion and into said liquid collection pan, said liquid collection pan being connected to said reservoir to return the collected liquid.

23. The environmental control system of claim 22, wherein said liquid pump is a variable pump to provide varying flow rates throughout said second control loop, said variable pump being operatively connected to said relative humidity sensor and adapted to change the liquid flow rate inversely proportional to a change in the relative humidity in the enclosure.

24. The environmental control system of claim 22, wherein said reservoir includes a control valve operatively connected to a source of liquid, said control valve adapted to direct additional liquid into said reservoir when the liquid level goes below a predetermined level.

25. The environmental control system of claim 22, wherein said first and second liquids are water.

26. The environmental control system of claim 22 further comprising an air diffuser attached to said air handler to distribute air from said air handler into the interior of the enclosure.

27. A method for controlling the air temperature and relative humidity at predetermined levels within an enclosure, the steps comprising:
    circulating chilled water at a flow rate through a heat exchanging unit;
    drawing air over said heat exchanging unit to cool the air to a predetermined temperature;
    cascading the discharged chilled water from said heat exchanging unit down a liquid cascade unit to provide relative humidity control within the enclosure; and
    chilling the water discharged from said liquid cascade unit.

28. The method of claim 27, further comprising the steps of:
    monitoring the air temperature within the enclosure to operatively control when air is drawn over said heat exchanging unit; and
    monitoring the relative humidity within the enclosure to operatively control the flow rate of the water circulating down said liquid cascade unit.

29. A method for controlling the air temperature and relative humidity at predetermined levels within an enclosure, the steps comprising:
    circulating a first chilled liquid through a first heat exchanging unit;
    circulating a second liquid through said first heat exchanging unit such that the second liquid is chilled by the first chilled liquid;
    circulating the second chilled liquid through a second heat exchanging unit
    drawing air over said second heat exchanging unit to cool the air to a predetermined temperature;
    cascading the discharged second chilled liquid from said second heat exchanging unit down a liquid cascade unit such that relative humidity control within the enclosure is maintain at a predetermined value; and
    recirculating the second liquid through said first heat exchanging unit.

30. The method of claim 29, wherein said first liquid is glycol and said second liquid is water.

31. A method for controlling the air temperature and relative humidity at predetermined levels within an enclosure, the steps comprising:
    circulating chilled water through a first water circuit, said first circuit comprising a first heat exchanging unit connected to a second heat exchanging unit connected to a liquid chiller;
    drawing air over said first heat exchanging unit to cool the air to a predetermined temperature;
    circulating water through a second water circuit at a predetermined flow rate, said first and second water circuits being separate of each other, said second water circuit comprising said second heat exchanging unit connected to a liquid cascade unit connected to a relative humidity control unit, said water in said second water circuit being cooled within said second heat exchanging unit by the chilled water in said first water circuit;
    cascading the chilled water from said second heat exchanging unit down said liquid cascade unit;
    monitoring the relative humidity within the enclosure; and
    changing the flow rate through said second water circuit to maintain the relative humidity a predetermined value.

32. An environmental control system for controlling an air temperature and relative humidity level of the interior of an enclosure, comprising:
    a chiller;
    an air handler having a cabinet with a heat exchanging unit and a blower disposed therein, said chiller operably connected to said heat exchanging unit, said blower adapted to direct enclosure air over said heat exchanging unit such that the enclosure air is cooled; and
    a liquid cascade unit coupled to said air handler and having at least one surface with an upper and lower portion and a liquid collection pan attached to said lower portion;
    a liquid supply configured to supply liquid to said upper portion such that liquid flows down from said upper portion toward said lower portion and into said liquid collection pan;
    wherein said air handler is operative to cool the air inside the enclosure and said liquid cascade unit is operative to regulate the relative humidity within the enclosure.

33. A method for controlling the air temperature and relative humidity within an enclosure, the steps comprising:
    drawing air over a heat exchanging unit with a blower to cool the air to a predetermined temperature, said heat exchanging unit being operably connected to a source of chilled liquid; and
    supplying water between an upper portion of a liquid cascade unit to a lower portion of said liquid cascade unit to provide relative humidity control within the enclosure.

* * * * *